(12) United States Patent
Sui et al.

(10) Patent No.: US 11,586,480 B2
(45) Date of Patent: Feb. 21, 2023

(54) EDGE COMPUTING WORKLOAD BALANCING

(71) Applicant: International Business Machines Corporation, Armonk, NY (US)

(72) Inventors: Guang Han Sui, Beijing (CN); Jing Li, Beijing (CN); Bin Xu, Beijing (CN); Fei Qi, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 17/102,581

(22) Filed: Nov. 24, 2020

(65) Prior Publication Data

US 2022/0164242 A1 May 26, 2022

(51) Int. Cl.
*G06F 9/50* (2006.01)
*G06F 9/48* (2006.01)
*G06F 11/32* (2006.01)
*G06F 11/34* (2006.01)

(52) U.S. Cl.
CPC .......... *G06F 9/5083* (2013.01); *G06F 9/4881* (2013.01); *G06F 9/505* (2013.01); *G06F 11/328* (2013.01); *G06F 11/3414* (2013.01); *G06F 2209/508* (2013.01); *G06F 2209/5022* (2013.01)

(58) Field of Classification Search
CPC .................................................. G06F 9/5083
See application file for complete search history.

(56) References Cited

U.S. PATENT DOCUMENTS

| 7,584,292 B2 | 9/2009 | Bae et al. |
| 10,671,453 B1 | 6/2020 | Kamran et al. |
| 2016/0036724 A1* | 2/2016 | Syed .................. H04L 41/5025 709/226 |
| 2019/0327506 A1 | 10/2019 | Zou et al. |

FOREIGN PATENT DOCUMENTS

WO         2018158404 A1      9/2018

OTHER PUBLICATIONS

Fan, "Towards Workload Balancing in Fog Computing Empowered IoT", IEEE Transactions On Network Science and Engineering, 2018, 11 pages.

(Continued)

*Primary Examiner* — Charlie Sun
(74) *Attorney, Agent, or Firm* — Stosch Sabo

(57) ABSTRACT

A set of workload criteria is determined from a workload associated with a plurality of sources. The workload is divided among a set of workload groups according to the set of workload criteria and a first workload scheduler. A set of edge computing resources is assigned to each workload group within the set according to the set of workload criteria and the set of workload groups. A portion of the workload associated with a subset of the plurality of sources is handled by a first subset of edge computing resources and a second workload scheduler, where the subset of sources is associated with a first workload group. The handling includes balancing, by the second workload scheduler, the portion of the workload among the subset of sources. The handled workload is reported to a control center.

20 Claims, 6 Drawing Sheets

(56) References Cited

OTHER PUBLICATIONS

"A System and Method for Controlled Perturbation of Workload Execution Resources", ip.com, An IP.com Prior Art Database Technical Disclosure, IP.com No. IPCOM000260929D, IP.com Electronic Publication Date: Jan. 8, 2020, 5 pages.
Li et al., "A new load balancing strategy by task allocation in edge computing based on intermediary nodes", EURASIP Journal on Wireless Communications and Networking, 2020, 10 pages.
Mell et al., "The NIST Definition of Cloud Computing", Recommendations of the National Institute of Standards and Technology, Special Publication 800-145, Sep. 2011, 7 pages.

* cited by examiner

EDGE COMPUTING WORKLOAD BALANCING

BACKGROUND

The present disclosure relates generally to the field of workload management, and more particularly to balancing edge computing workloads.

Edge computing is gaining increasing popularity as it provides local resources with low latency for cloud computing environments. The "edge" of the cloud may be cloud computing resources that are located as close as possible to the client devices accessing the cloud computing resources. Shortening the physical distance between the client devices and the cloud can provide low latency and greater efficiency.

SUMMARY

Embodiments of the present disclosure include a method, computer program product, and system for balancing edge computing workloads.

A set of workload criteria is determined from a workload associated with a plurality of sources. The workload is divided among a set of workload groups according to the set of workload criteria and a first workload scheduler. A set of edge computing resources is assigned to each workload group within the set according to the set of workload criteria and the set of workload groups. A portion of the workload associated with a subset of the plurality of sources is handled by a first subset of edge computing resources and a second workload scheduler, where the subset of sources is associated with a first workload group. The handling includes balancing, by the second workload scheduler, the portion of the workload among the subset of sources. The handled workload is reported to a control center.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
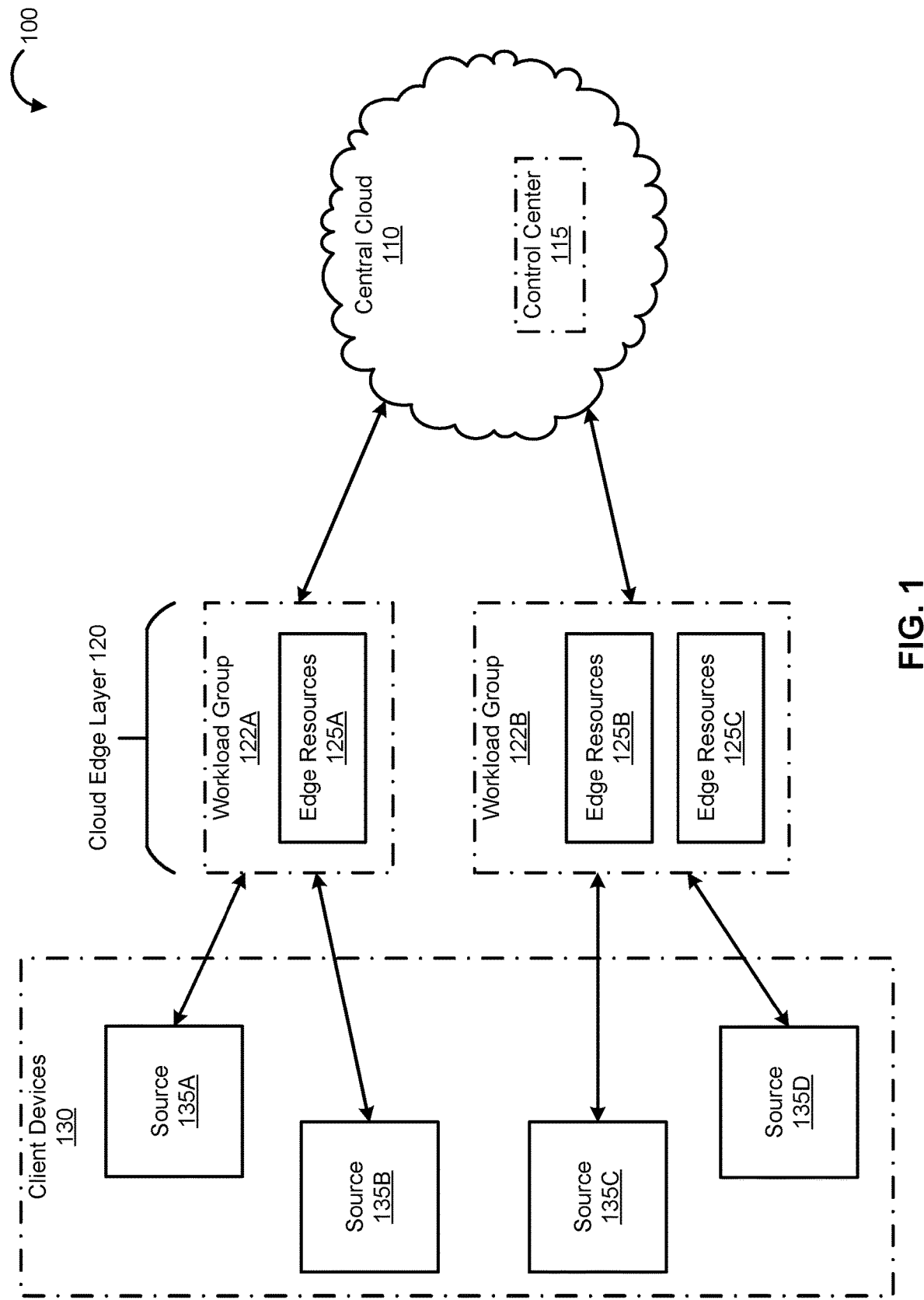
FIG. 1 illustrates an example network environment for edge computing workload balancing, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of workload management, and more particularly to balancing edge computing workloads. While the present disclosure is not necessarily limited to such applications, various aspects of the disclosure may be appreciated through a discussion of various examples using this context.

Computer networks, and especially the Internet, are used to share information. A significant amount of this information is handled using cloud computing architecture. Edge computing is gaining increasing popularity as it provides local resources with low latency for cloud computing environments. The "edge layer" of the cloud may be cloud computing resources that are located as close as possible to the client devices accessing the cloud computing resources. Shortening the physical distance between the client devices and the cloud may lead to low latency and greater efficiency.

Edge computing may further provide enhanced workload management in some instances. For example, in an environment where several client devices may need to act in concert (e.g., security cameras, clinical laboratory equipment, etc.), scheduling computing workloads and dividing the workloads among the client devices and the cloud computing resources may require several virtual machines and/or client devices to remain idle while waiting on workload processing by other network components. In such circumstances, lowering the communication latency among the client devices and the cloud computing components may increase efficiency and save time and cost. Further, utilizing the "edge layer" of the cloud may provide greater stability, as there may be fewer intermediary servers and fewer potential points of failure.

In addition to utilizing edge computing techniques, embodiments of the present disclosure contemplate specialized workload schedulers to manage the identification and evaluation of workloads (e.g., type of computing workload, estimated computing cost, number of iterations for repetitive tasks, timeline requirements, etc.), the creation of workload groups (e.g., determining the number and type of computing resources needed to handle the workload), the assignment of edge computing resources to the workload (e.g., assignment of physical and/or virtual machines that are as close as possible to the client devices/workload sources), and the balancing of workloads in response to failures at client devices/workload sources and/or edge computing resources or workload groups.

According to some embodiments, a first-level scheduler may be positioned at a control center within the cloud. In some embodiments, the control center may be a part of the traditional cloud, or it may be a part of the edge layer of the cloud. The first-level scheduler may be tasked with evaluating a workload and determining the workload criteria. For example, the first-level scheduler may collect information about the workload and the available edge computing resources, as described herein. In some embodiments, the first-level scheduler may further be tasked with the creation of second-level schedulers within the workload groups containing the edge computing resources (e.g., virtual and/or physical machines at the edge computing layer that will be dedicated to handling the workload). In some embodiments, workload criteria may include the number of workload sources in the plurality, a number of available sets of edge computing resources, a number of operations to be handled at each workload source within the plurality, and a set of capacity information for one or more virtual or physical machines expected to handle the workload. In some embodiments, the set of capacity information may include processing power, memory capacity, geographical distance to at least one workload source, connection quality, etc.

In embodiments, a first-level scheduler may divide the workload from the various client devices/workload sources among the created workload group(s). Workload groups may be created according to any suitable method, including but not limited to Naïve Bayes classification, logistic regression, using a decision tree, k-means clustering, centroid clustering around workload source(s), etc.

In embodiments, workload groups may comprise one or more virtual and/or physical computing machines (e.g., edge computing resources) residing within the edge layer of a cloud. The edge computing resources within each workload group may intercommunicate and cooperate to handle a portion of the workload from the client devices. In embodiments, the data/workload from a subset of the workload sources may be, at least initially, dedicated to a particular workload group. A determination regarding which workload sources are assigned to which workload group(s) may be performed based on the percentage of the workload expected from the workload source(s). The workload source(s) may be dedicated, at least initially, to the workload group(s) by correlating the expected workload percentage to the computing capability/bandwidth of the workload group(s).

According to some embodiments, the second-level scheduler(s) may communicate among themselves to balance the workload(s) and manage the data flow from the client devices/workload sources, to the workload groups, to the control center. In embodiments, each set of edge computing resources (e.g., each virtual or physical machine within the edge layer dedicated to the workload) may include a second-level scheduler.

According to some embodiments, a particular second-level scheduler may receive or pull data (e.g., a portion of the workload) from one or more of the workload sources assigned to the workload group that includes the particular second-level scheduler, process/handle the data, and communicate with the other second-level schedulers within the workload group to handle the entire workload (or a portion of the workload, in embodiment with multiple workload groups) in concert.

In embodiments, the second-level schedulers may manage the idle/busy stages of the workload sources to obtain the same workload handling rate across the second-level schedulers within the workload group. In yet other embodiments, a normalized workload handling rate may be obtained to account for differences in capabilities among the edge computing resources associated with each second-level scheduler.

It is anticipated that, during the course of operation, errors and maintenance downtimes, among other factors, will contribute to a dynamic workload. In some embodiments, the second-level schedulers may detect when a client device or set of edge computing resources ceases normal operation or is otherwise unavailable. In addition to mitigation procedures (e.g., rebalancing the workload flow among workload groups and/or sets of edge computing resources), the second-level scheduler(s) may report the problem to the first-level scheduler at the control center. In some embodiments, the first-level scheduler may adjust the workload groups and/or the sets of edge computing resources assigned to the workload groups to rebalance the workload coming from the operable workload sources.

Using the techniques described herein, the workload to each set of edge computing resources may be balanced, stability of the system may be enhanced, and responses to errors and other problems may be mitigated and/or resolved in a timely manner.

Referring now to FIG. 1, illustrated is an example network environment for edge computing workload balancing, in accordance with embodiments of the present disclosure. Example network environment 100 may include, for example, central cloud 110, cloud edge layer 120, and client devices 130. In some embodiments, certain functions of client devices 130, cloud edge layer 120, and central cloud 110 may be implemented at a location different from the depiction.

According to embodiments, the client devices 130, cloud edge layer 120, and central cloud 110 may be comprised of computer systems (e.g., may contain the same or similar components as computer system 601). The client devices 130, cloud edge layer 120, and central cloud 110 may be configured to communicate with each other through an internal or external network interface (not shown). The network interfaces may be, e.g., modems, wireless network adapters, Ethernet adapters, etc. The client devices 130, cloud edge layer 120, and central cloud 110 may be further equipped with displays or monitors (not shown). Additionally, the client devices 130, cloud edge layer 120, and central cloud 110 may include optional input devices (e.g., a keyboard, mouse, scanner, or other input device), and/or any commercially available or custom software (e.g., image processing software, object identification software, etc.). In some embodiments, the client devices 130, cloud edge layer 120, and central cloud 110 may include servers, desktops, laptops, IoT (Internet of Things) devices, or hand-held devices.

Client devices 130, cloud edge layer 120, and central cloud 110 may further include storage (e.g., storage interface 614). The storage may include, for example, virtualized disk drives, physical hard disk drives, solid state storage drives, or any other suitable storage media. In some embodiments, workload data and metadata may be stored, temporarily or permanently.

The client devices 130, cloud edge layer 120, and central cloud 110 may be distant from each other and may communicate over a network (not shown). In embodiments, the central cloud 110 may be a central hub from which cloud edge layer 120 and client devices 130 can establish a communication connection, such as in a client-server networking model. In some embodiments, the central cloud 110, cloud edge layer 120, and client devices 130 may be configured in any other suitable network relationship (e.g., in a peer-to-peer configuration or using another network topology).

In embodiments, the connections among the components of networking environment 100 can be implemented using any number of any suitable communications media. For example, a wide area network (WAN), a local area network (LAN), the Internet, or an intranet. In certain embodiments, the client devices 130, cloud edge layer 120, and the central cloud 110 may be local to each other and communicate via any appropriate local communication medium. For example, the client devices 130 and the cloud edge layer 120 may communicate using a local area network (LAN), one or more hardwire connections, a wireless link or router, or an intranet. In some embodiments, client devices 130, cloud edge layer 120, and the central cloud 110, and any other devices, may be communicatively coupled using a combination of one or more networks and/or one or more local connections. For example, the client devices 130 may be hardwired to the cloud edge layer 120 (e.g., connected with an Ethernet cable) while a third client device (e.g., control center 115 or some other device) may communicate with the client devices 130 over a network, such as an intranet or the Internet.

In some embodiments, the network environment 100 can be implemented within, or as a part of, a cloud computing environment. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over a network. Further detail regarding cloud computing is given with respect to FIGS. 4 & 5.

According to embodiments, client devices 130 may include sources 135A-D. Sources 135A-D may include, for example, client devices from which a workload is received. For example, a security camera system may include video cameras correlating to sources 135A-D, and workload may be the video/audio feed received from the cameras. In some embodiments, the portion of the workload received from each of sources 135A-D may be static (e.g., the same number of frames from each camera), or it may be normalized (e.g., 5 MB of video data from each camera. In yet other embodiments, the workload may be dynamic (e.g., a different number of frames or a different amount of data received from each source).

According to embodiments, cloud edge layer 120 may include workload groups, such as workload groups 122A-B. As described herein, a first workload scheduler (not pictured) at a control center 115 may generate workload groups 122A-B according to the workload criteria, as described herein. Edge resources, such as edge resources 125A-C may be assigned to each of workload group 122A and 122B according to the workload criteria and the percentage of workload expected to be handled by each workload group. Cloud edge layer 120 may be a part of central cloud 110, or it may be peripheral thereto. In some embodiments, cloud edge layer 120 may be a hybrid cloud layer between sources 135A-D and a central cloud 110.

According to embodiments, workload group 122A may include a set of edge resources 125A. Workload group 122B may include, for example, two sets of edge resources 125B-C. Each set of edge resources 125A-C may represent a virtual (or in some embodiments, physical) machine or device for handling/processing the portion of the workload assigned its respective workload group. For example, if sources 135A-D are security cameras, edge resources 125A-C may represent graphical processing units (GPUs) or virtual machines with GPUs. As described herein, each set of edge resources 125A-C may include a second-level scheduler (not pictured).

Central cloud 110 may include a control center 115. Control center 115 may include a first-level scheduler (not shown) and may coordinate the evaluation of workloads, creation of workload groups 122A-B, the division and initial workload balancing of the workload among the workload groups 122A-B, the assignment of edge resources 125A-C among workload groups 122A-B, and the rebalancing of the workload in the even that a component of networking environment 100 becomes nonfunctional (e.g., a set of edge computing resources). In embodiments, control center 115 may further provide the results of a processed workload to a user or administrator, and may allow such a user/administrator to dictate workload parameters (e.g., goals for an application gathering data from sources 135A-D).

It is noted that FIG. 1 is intended to depict the representative major components of an example network environment 100. In some embodiments, however, individual components may have greater or lesser complexity than as represented in FIG. 1; components other than or in addition to those shown in FIG. 1 may be present, and the number, type, and configuration of such components may vary.

Figure 2:
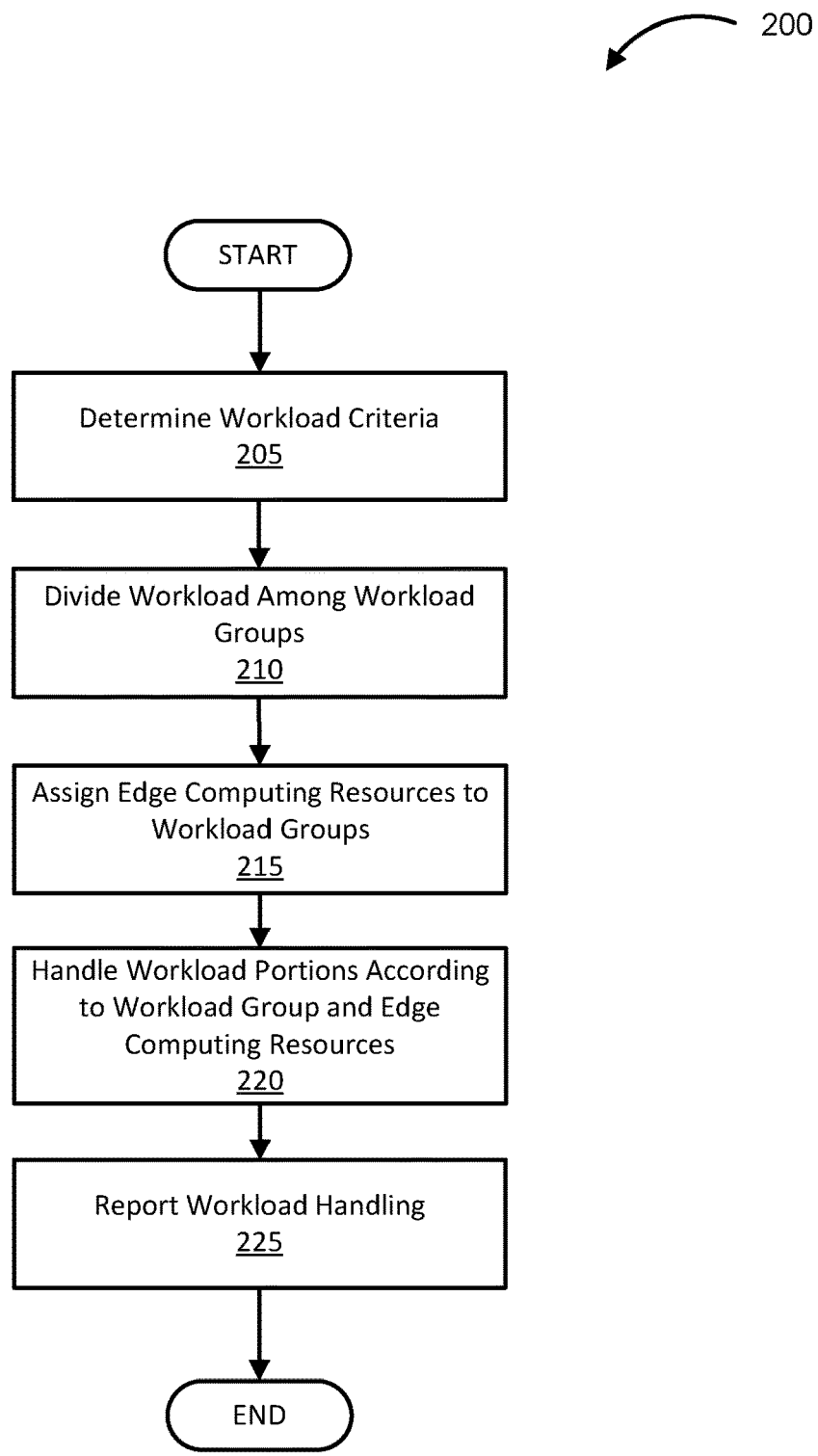
FIG. 2 illustrates an example method for balancing edge computing workloads, in accordance with embodiments of the present disclosure.

Turning now to FIG. 2, illustrated is a flowchart of an example method 200 for balancing edge computing workloads, in accordance with embodiments of the present disclosure. Example method 200 may begin at 205, where workload criteria is determined. As described herein, an administrator may dictate the goals of an application or program utilizing a plurality of workload sources and a cloud edge layer, and the workload criteria may be determined by a first-level scheduler at a control center. In embodiments, workload criteria may consider, for example: type of computing workload (e.g., video processing, machine learning algorithm, artificial intelligence program, audio processing, block chain application, etc.), estimated computing cost (e.g., financial cost, computing resources consumed, etc.), number of iterations for repetitive tasks, timeline requirements (e.g., timeframe/schedule for operation of workload sources), etc.

At 210, the workload is divided among workload groups. In embodiments, workload groups may be created, by a scheduler, according to the workload criteria, by determining the number and type of computing resources needed to handle the workload and grouping those computing resources into logical groups. In embodiments, this may include an arbitrary division, or it may be achieved by administrator/user preference, or by various classification techniques, such as Naïve Bayes classification, logistic regression, using a decision tree, k-means clustering, centroid clustering around workload source(s), etc.

At 215, sets of edge computing resources may be assigned, by a scheduler, to each workload group according to the workload criteria and the percentage of workload expected to be handled/processed by each workload group, as described herein.

At 220, each subset of edge computing resources (e.g., each virtual machine/device) within each workload group handles, according to an internal scheduler (e.g., second-level scheduler), its respective portion of the workload. The respective workload portion may, in embodiments, be associated with a particular subset of the plurality of workload sources.

At 225, the handled workload is reported to a control center. In embodiments, the control center may report, either periodically or in real time, the results to a user/administrator, as described herein.

For example, if an administrator wishes a network of security cameras (e.g., workload sources) to monitor an area, the workload (e.g., video feed) may be evaluated according to the number of frames each camera should produce, or the amount of time each camera should be in operation, or the total amount of raw data expected from each camera, to generate a workload criteria. Workload groups may be generated to handle portions of the workload, and sets of edge computing resources (e.g., virtual machine(s)) may be assigned to these workload groups according to the percentage of the total workload that each workload group is expected to handle. Each virtual machine may, via a second-level scheduler, act in concert with the others to handle the workload assigned to the workload group. Once handled, the results (e.g., total video feed data) may be reported to a control center, where the user/administrator may review it.

Figure 3:
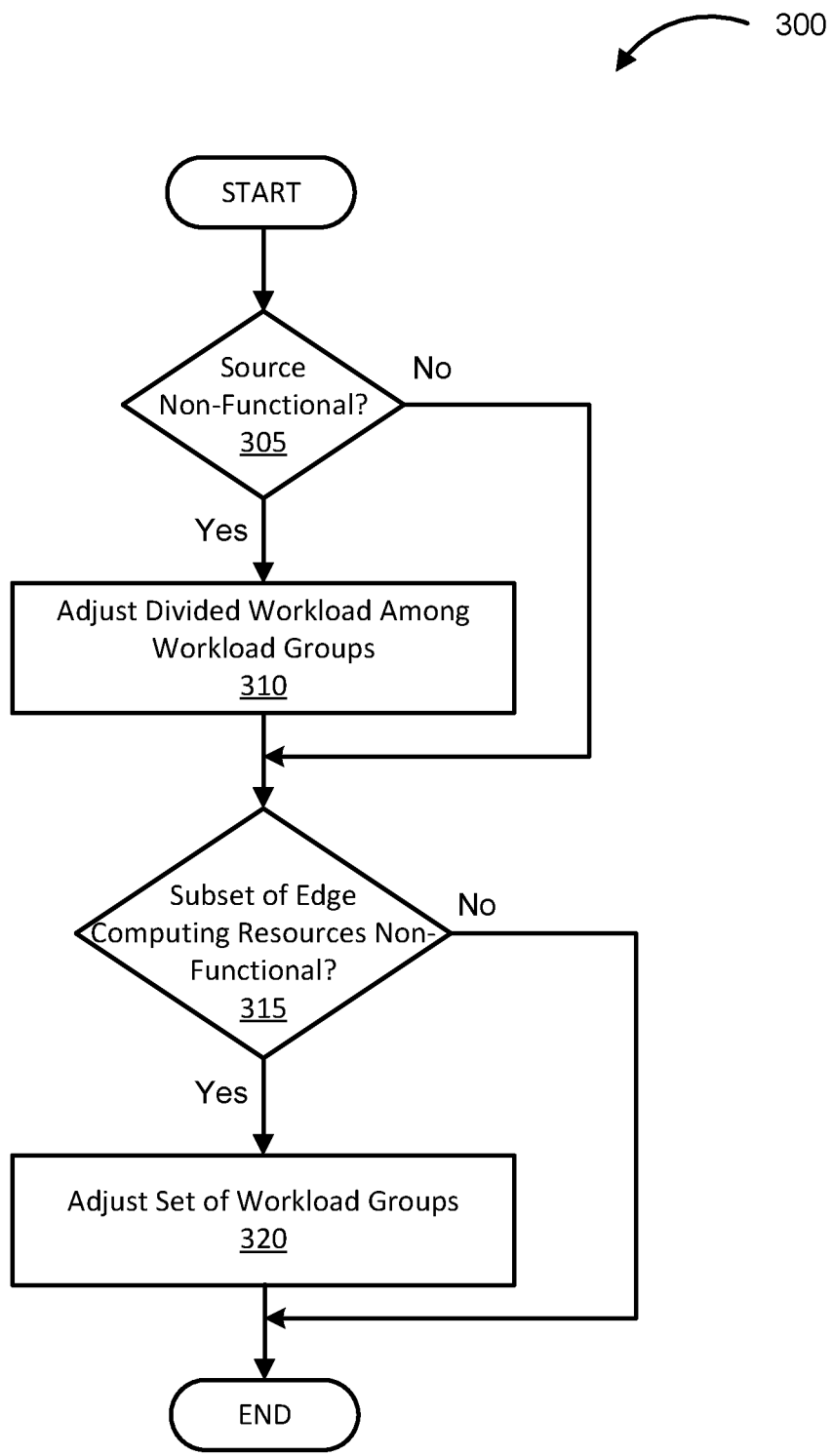
FIG. 3 illustrates an example method for error correction to balance edge computing workloads, in accordance with embodiments of the present disclosure.

Referring now to FIG. 3, illustrated is an example method for error correction to balance edge computing workloads, in accordance with embodiments of the present disclosure. Example method 300 may begin at 305, where second-level schedulers monitor workload sources to determine whether they have gone offline or experienced some kind of error.

If, at 305, non-functionality of the workload source is detected, the workload is rebalanced among the workload group(s) at 310. This may be achieved, in embodiments, via communication among the second-level schedulers and may include creation of new virtual machines, migration of data and/or tasks among the virtual machines and/or workgroups, etc.

Thereafter, or if no non-functionality is detected at 305, the method may proceed to 315 where each subset of edge computing resources (e.g., each virtual or physical machine within the edge layer) is monitored. The monitoring may, for example, determine whether the set of edge computing resources has gone offline or experiences some kind of error.

If, at 315, non-functionality of one or more subsets of edge computing resources is detected, the workload groups may be adjusted at 320, by a first-level scheduler. This may include, for example, upscaling or downscaling workload groups, reassignment of workload sources among workload groups, creation and/or decommission of sets/subsets of edge computing resources (e.g., virtual machines), etc., as described herein.

It is to be understood that although this disclosure includes a detailed description on cloud computing, implementation of the teachings recited herein are not limited to a cloud computing environment. Rather, some embodiments of the present invention are capable of being implemented in conjunction with any other type of computing environment now known or later developed.

Cloud computing is a model of service deliver for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
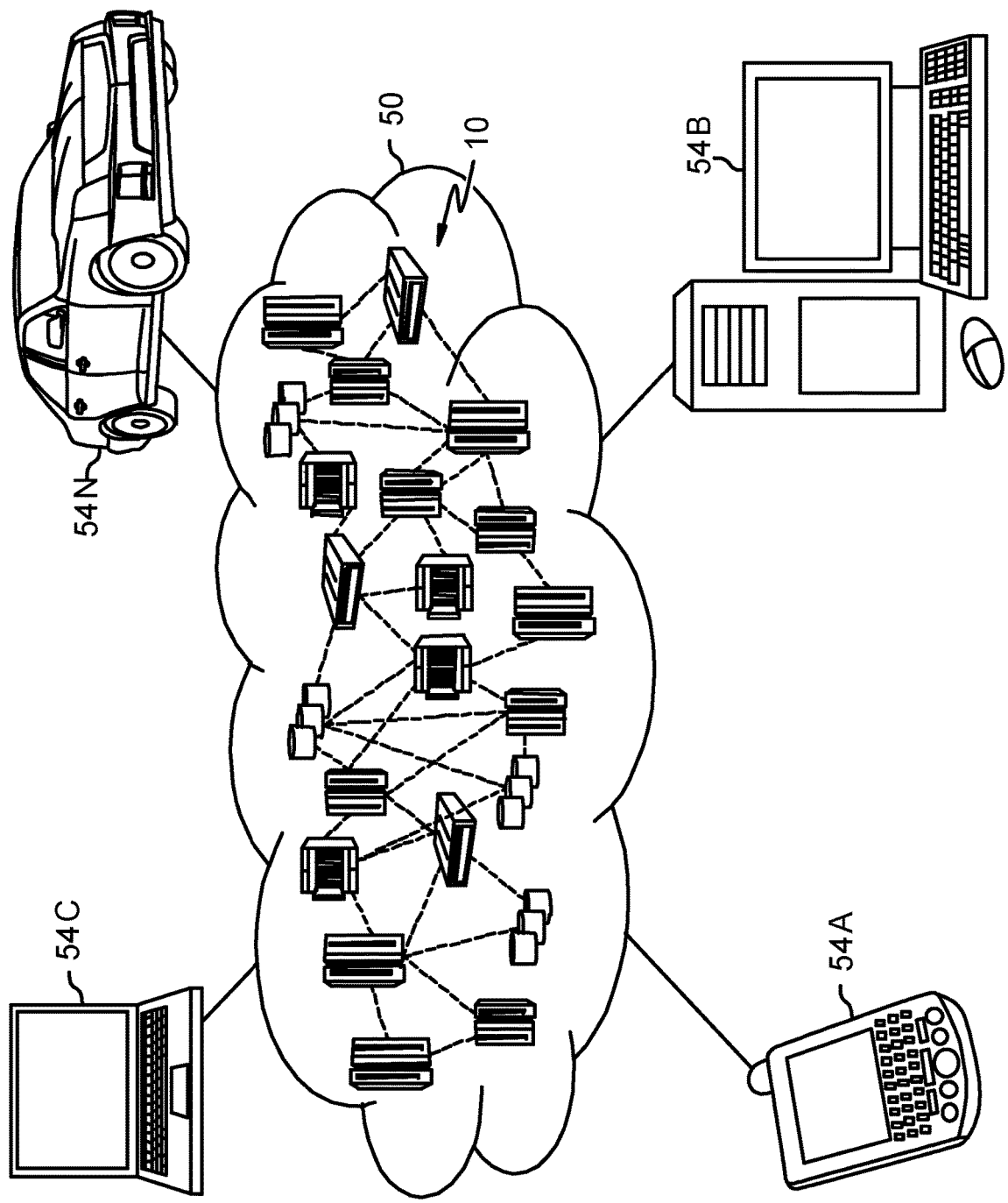
FIG. 4 depicts a cloud computing environment according to an embodiment of the present disclosure.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
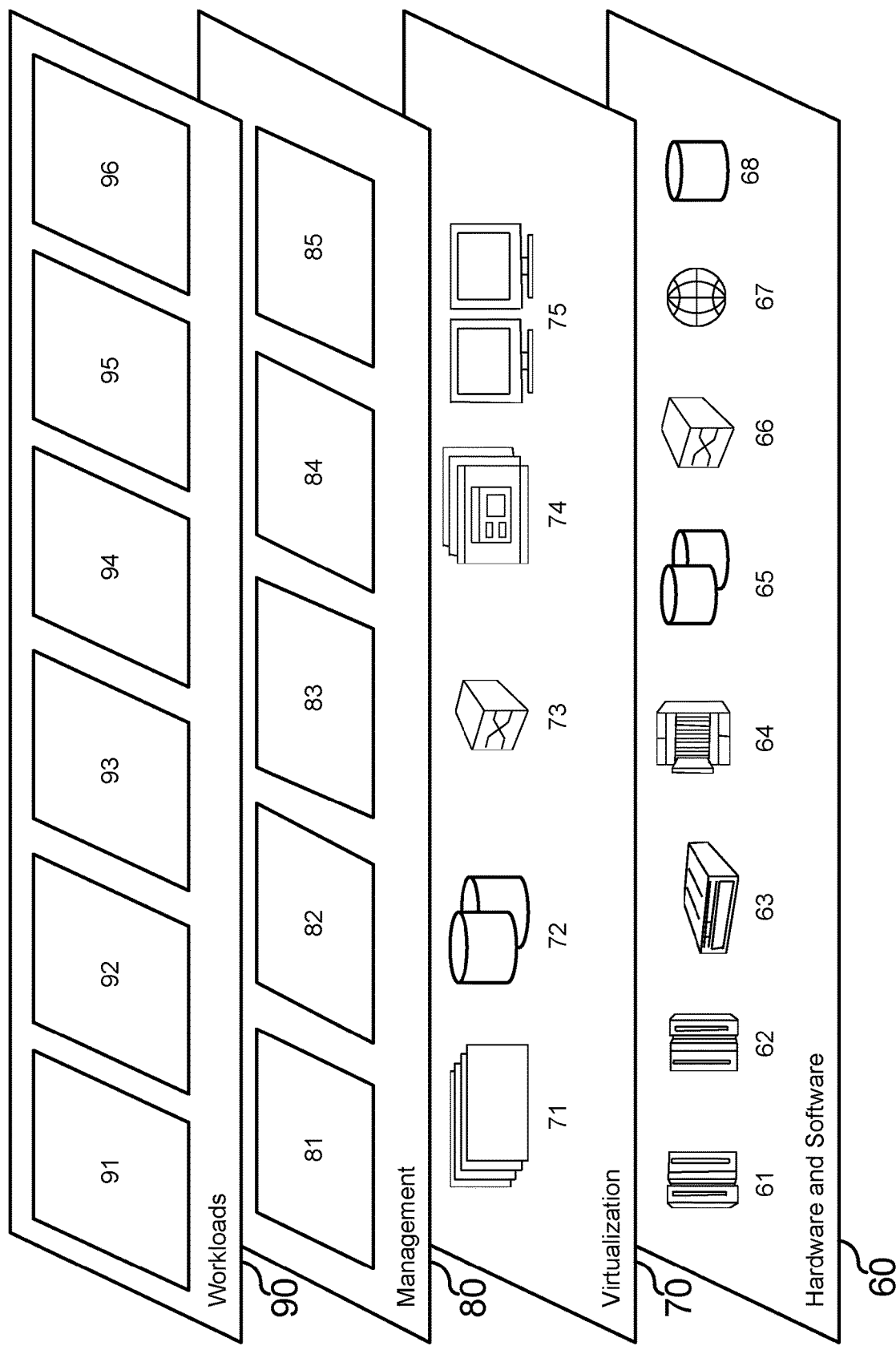
FIG. 5 depicts abstraction model layers according to an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and some embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and edge computing workload balancing 96.

Figure 6:
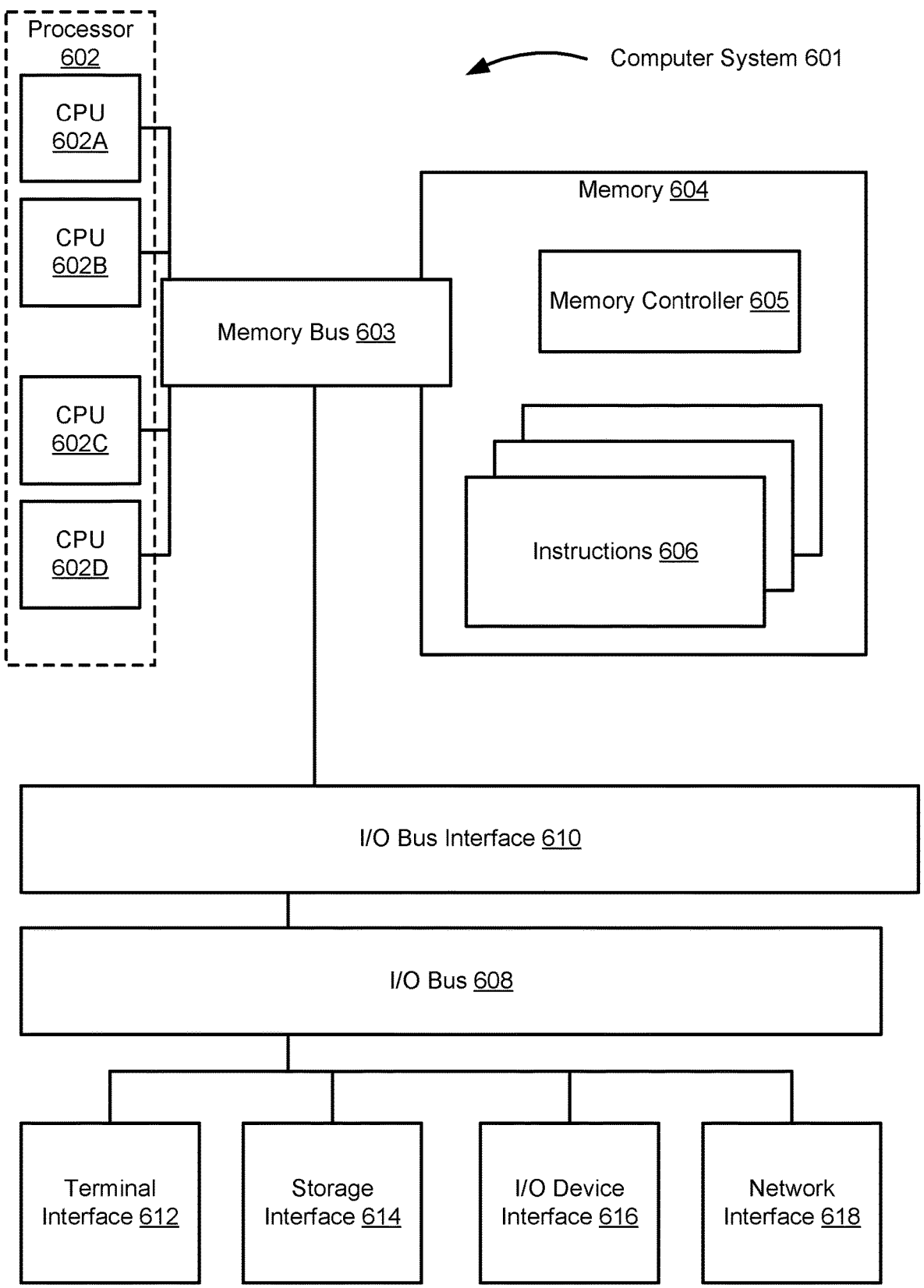
FIG. 6 depicts a high-level block diagram of an example computer system that may be used in implementing embodiments of the present disclosure.

Referring now to FIG. 6, shown is a high-level block diagram of an example computer system 601 that may be configured to perform various aspects of the present disclosure, including, for example, methods 200/300, described in FIGS. 2 and 3. The example computer system 601 may be used in implementing one or more of the methods or modules, and any related functions or operations, described herein (e.g., using one or more processor circuits or computer processors of the computer), in accordance with embodiments of the present disclosure. In some embodiments, the illustrative components of the computer system 601 comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may comprise one or more levels of on-board cache. Memory subsystem 604 may include instructions 606 which, when executed by processor 602, cause processor 602 to perform some or all of the functionality described above with respect to FIGS. 2 and 3.

In some embodiments, the memory subsystem 604 may comprise a random-access semiconductor memory, storage device, or storage medium (either volatile or non-volatile) for storing data and programs. In some embodiments, the memory subsystem 604 may represent the entire virtual memory of the computer system 601 and may also include the virtual memory of other computer systems coupled to the computer system 601 or connected via a network. The memory subsystem 604 may be conceptually a single monolithic entity, but, in some embodiments, the memory subsystem 604 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 604 may contain elements for control and flow of memory used by the CPU 602. This may include a memory controller 605.

Although the memory bus 603 is shown in FIG. 6 as a single bus structure providing a direct communication path among the CPUs 602, the memory subsystem 604, and the I/O bus interface 610, the memory bus 603 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative example components of an exemplary computer system 601. In some embodiments, however, individual components may have greater or lesser complexity than as represented in FIG. 6, components other than or in addition to those shown in FIG. 6 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for balancing edge computing workloads, the method comprising:
    determining, from a workload associated with a plurality of sources, a set of workload criteria;
    dividing, according to the set of workload criteria and at a first workload scheduler, the workload among a set of workload groups;
    assigning, according to the set of workload criteria and the set of workload groups, a set of edge computing resources to each workload group within the set of workload groups;
    handling, by a first subset of edge computing resources and a second workload scheduler, a portion of the workload, the portion associated with a subset of the plurality of sources, the subset of sources associated with a first workload group,
    wherein the handling includes balancing, by the second workload scheduler, the portion of the workload among the subset of sources; and
    reporting the handled workload to a control center.

2. The method of claim 1, wherein balancing the portion of the workload further comprises:
    determining, by the second workload scheduler, a first source of the subset of sources is nonfunctional; and
    in response to reporting the nonfunctional first source to the first workload scheduler, adjusting, by the first workload scheduler, the divided workload among the set of workload groups to account for the nonfunctional source.

3. The method of claim 1, wherein balancing the portion of the workload further comprises:
    determining, by the second workload scheduler, a second subset of edge computing resources is nonfunctional; and
    in response to reporting the nonfunctional second subset of edge computing resources to the first workload scheduler, adjusting the set of workload groups to account for the nonfunctional second set of edge computing resources.

4. The method of claim 1, wherein the set of edge computing resources is assigned among the set of workload groups according to a percentage of the workload divided into each workload group.

5. The method of claim 4, wherein the second workload schedulers associated with the first workload group intercommunicate to balance a workload handling rate among the subset of the plurality of sources.

6. The method of claim 5, wherein the set of workload criteria includes a number of workload sources in the plurality, a number of available sets of edge computing resources, a number of operations to be handled at each workload source within the plurality, and a set of capacity information for each available set of edge computing resources.

7. The method of claim 6, wherein the set of capacity information includes processing power, memory capacity, distance to at least one workload source of the plurality, and a connection quality.

8. A computer program product for balancing edge computing workloads, the computer program product comprising a computer readable storage medium having program instructions embodied therewith, the program instructions executable by a device to cause the device to:
    determine, from a workload associated with a plurality of sources, a set of workload criteria;
    divide, according to the set of workload criteria and at a first workload scheduler, the workload among a set of workload groups;
    assign, according to the set of workload criteria and the set of workload groups, a set of edge computing resources to each workload group within the set of workload groups;
    handle, by a first subset of edge computing resources and a second workload scheduler, a portion of the workload, the portion associated with a subset of the plurality of sources, the subset of sources associated with a first workload group,
    wherein the handling includes balancing, by the second workload scheduler, the portion of the workload among the subset of sources; and
    report the handled workload to a control center.

9. The computer program product of claim 8, wherein balancing the portion of the workload further comprises:
    determining, by the second workload scheduler, a first source of the subset of sources is nonfunctional; and
    in response to reporting the nonfunctional first source to the first workload scheduler, adjusting, by the first workload scheduler, the divided workload among the set of workload groups to account for the nonfunctional source.

10. The computer program product of claim 8, wherein balancing the portion of the workload further comprises:
    determining, by the second workload scheduler, a second subset of edge computing resources is nonfunctional; and
    in response to reporting the nonfunctional second subset of edge computing resources to the first workload scheduler, adjusting the set of workload groups to account for the nonfunctional second set of edge computing resources.

11. The computer program product of claim 8, wherein the set of edge computing resources is assigned among the set of workload groups according to a percentage of the workload divided into each workload group.

12. The computer program product of claim 11, wherein the second workload schedulers associated with the first workload group intercommunicate to balance a workload handling rate among the subset of the plurality of sources.

13. The computer program product of claim 12, wherein the set of workload criteria includes a number of workload sources in the plurality, a number of available sets of edge computing resources, a number of operations to be handled at each workload source within the plurality, and a set of capacity information for each available set of edge computing resources.

14. The computer program product of claim 13, wherein the set of capacity information includes processing power, memory capacity, distance to at least one workload source of the plurality, and a connection quality.

15. A system for balancing edge computing workloads, the system comprising:
   a memory subsystem, with program instructions included thereon; and
   a processor in communication with the memory subsystem, wherein the program instructions cause the processor to:
      determine, from a workload associated with a plurality of sources, a set of workload criteria;
      divide, according to the set of workload criteria and at a first workload scheduler, the workload among a set of workload groups;
      assign, according to the set of workload criteria and the set of workload groups, a set of edge computing resources to each workload group within the set of workload groups;
      handle, by a first subset of edge computing resources and a second workload scheduler, a portion of the workload, the portion associated with a subset of the plurality of sources, the subset of sources associated with a first workload group,
      wherein the handling includes balancing, by the second workload scheduler, the portion of the workload among the subset of sources; and
      report the handled workload to a control center.

16. The system of claim 15, wherein balancing the portion of the workload further comprises:
   determining, by the second workload scheduler, a first source of the subset of sources is nonfunctional; and
   in response to reporting the nonfunctional first source to the first workload scheduler, adjusting, by the first workload scheduler, the divided workload among the set of workload groups to account for the nonfunctional source.

17. The system of claim 15, wherein balancing the portion of the workload further comprises:
   determining, by the second workload scheduler, a second subset of edge computing resources is nonfunctional; and
   in response to reporting the nonfunctional second subset of edge computing resources to the first workload scheduler, adjusting the set of workload groups to account for the nonfunctional second set of edge computing resources.

18. The system of claim 15, wherein the set of edge computing resources is assigned among the set of workload groups according to a percentage of the workload divided into each workload group.

19. The system of claim 18, wherein the second workload schedulers associated with the first workload group intercommunicate to balance a workload handling rate among the subset of the plurality of sources.

20. The system of claim 19, wherein the set of workload criteria includes a number of workload sources in the plurality, a number of available sets of edge computing resources, a number of operations to be handled at each workload source within the plurality, and a set of capacity information for each available set of edge computing resources.

* * * * *